(12) United States Patent
Yoon et al.

(10) Patent No.: US 8,737,686 B2
(45) Date of Patent: May 27, 2014

(54) 3D OBJECT TRACKING METHOD AND APPARATUS

(75) Inventors: Suk June Yoon, Seoul (KR); Kyung Shik Roh, Seongnam-si (KR); Won Jun Hwang, Suwon-si (KR); Seung Yong Hyung, Yongin-si (KR); Sung Hwan Ahn, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 158 days.

(21) Appl. No.: 13/204,888

(22) Filed: Aug. 8, 2011

(65) Prior Publication Data

US 2012/0076355 A1    Mar. 29, 2012

(30) Foreign Application Priority Data

Sep. 29, 2010    (KR) .................. 10-2010-0094134

(51) Int. Cl.
*G06K 9/00*    (2006.01)

(52) U.S. Cl.
USPC ........................................ 382/103; 382/154

(58) Field of Classification Search
USPC ........... 382/103, 107, 153, 154; 345/419–420
See application file for complete search history.

(56) References Cited

U.S. PATENT DOCUMENTS

| | | | | |
|---|---|---|---|---|
| 5,754,680 | A * | 5/1998 | Sato et al. ...................... | 382/154 |
| 5,845,009 | A * | 12/1998 | Marks et al. ................... | 382/228 |
| 5,878,151 | A * | 3/1999 | Tang et al. ..................... | 382/103 |
| 6,504,546 | B1 * | 1/2003 | Cosatto et al. ................ | 345/473 |
| 7,103,211 | B1 * | 9/2006 | Medioni et al. ............... | 382/154 |
| 7,865,267 | B2 * | 1/2011 | Sabe et al. ..................... | 700/245 |
| 8,279,286 | B2 * | 10/2012 | Wagg et al. ................... | 348/169 |
| 2007/0255454 | A1 * | 11/2007 | Dariush ........................ | 700/245 |
| 2009/0324018 | A1 * | 12/2009 | Tell ............................... | 382/103 |
| 2010/0104135 | A1 * | 4/2010 | Nakajima ...................... | 382/103 |
| 2011/0115909 | A1 * | 5/2011 | Sternberg et al. ............. | 348/143 |
| 2011/0254950 | A1 * | 10/2011 | Bibby et al. ................... | 348/135 |

OTHER PUBLICATIONS

Kunii, et al. (Automatic Stereo Matching Using Optical Flow for 3D Object Modeling), International Archives of Photogrammetry and Remote Sensing, vol. XXXIII, part B5.. Amsterdam 2000, pp. 459-465.*

* cited by examiner

*Primary Examiner* — Daniel Mariam
(74) *Attorney, Agent, or Firm* — Staas & Halsey LLP

(57) ABSTRACT

A 3D object tracking method and apparatus in which a model of an object to be tracked is divided into a plurality of polygonal planes and the object is tracked using texture data of the respective planes and geometric data between the respective planes to enable more precise tracking. The 3D object tracking method includes modeling the object to be tracked to generate a plurality of planes, and tracking the plurality of planes, respectively. The modeling of the object includes selecting points from among the plurality of planes, respectively, and calculating projective invariants using the selected points.

19 Claims, 4 Drawing Sheets

3D OBJECT TRACKING METHOD AND APPARATUS

CROSS-REFERENCE TO RELATED APPLICATIONS

This application claims the benefit of Korean Patent Application No. 2010-0094134, filed on Sep. 29, 2010 in the Korean Intellectual Property Office, the disclosure of which is incorporated herein by reference.

BACKGROUND

1. Field

Embodiments relate to a method of tracking movement of a 3D object through a vision system, such as a camera.

2. Description of the Related Art 3D model-based tracking is a process of generating a 3D model of an object to be tracked and performing edge-based tracking of an image of the model. That is, the model is projected on the image using 3D rigid body transform of the previous position of the model using characteristics of a camera, and the edge of the image is searched in the vertical direction of a space of the edge of the 3D model. Then, a 3D rigid body transform matrix in which a distance error between the edge of the image and the model is minimized is calculated. Such a process is applied to each frame, thereby tracking the 3D model.

As described above, in order to calculate the 3D model rigid body transform matrix of the 3D model, the 3D model is projected on the image based on the previous position of the 3D model, and then a plurality of points is sampled from the edge. Points where the sampled points meet the edge of the image meet in the vertical direction of the space of the 3D model are obtained, and then the 3D rigid body transform matrix where the sum total of distances to these points is minimized is calculated. Here, when the points are not correctly matched to the edge of the 3D model, the 3D rigid body transform matrix is incorrectly calculated, and thus precise tracking of the object is not achieved.

SUMMARY

Therefore, it is an aspect of one or more embodiments to provide a 3D object tracking method and apparatus in which a model of an object to be tracked is divided into a plurality of polygonal planes and the object is tracked using texture data of the respective planes and geometric data between the respective planes to enable more precise tracking.

Additional aspects of embodiments will be set forth in part in the description which follows and, in part, will be obvious from the description, or may be learned by practice of the embodiments.

In accordance with an aspect of one or more embodiments, a 3D object tracking method includes modeling an object to be tracked to generate a plurality of planes, and tracking the plurality of planes, respectively.

The modeling of the object may include selecting points from among the plurality of planes, respectively, and calculating projective invariants using the selected points.

The tracking of the plurality of the planes may be achieved through model-based tacking.

In the tracking of the plurality of planes, when a tracking failure rate is below a designated level, virtual planes of planes, tracking of which has failed, may be generated, and the object may be tracked using the virtual planes.

In the tracking of the plurality of planes, when the tracking failure rate is more than the designated level, a tracking failure warning may be generated and the tracking may be stopped.

The designated level may be 50%.

In accordance with another aspect of one or more embodiments, a 3D object tracking apparatus includes an imaging device to capture an image of an object to be tracked, and a control unit to perform modeling of the object to be tracked to generate a plurality of planes, and to track the object by tracking the plurality of planes, respectively.

In order to perform the modeling of the object, the control unit may select points from among the plurality of planes, respectively and calculate projective invariants using the selected points.

The tracking of the plurality of the planes may be achieved through model-based tacking.

In the tracking of the plurality of planes, when a tracking failure rate is below a designated level, the control unit may generate virtual planes of planes, tracking of which has failed, and track the object using the virtual planes In the tracking of the plurality of planes, when the tracking failure rate is more than the designated level, the control unit may generate a tracking failure warning and stop the tracking.

The designated level may be 50%.

BRIEF DESCRIPTION OF THE DRAWINGS

These and/or other aspects of embodiments will become apparent and more readily appreciated from the following description of the embodiments, taken in conjunction with the accompanying drawings of which.

DETAILED DESCRIPTION

Figure 1:
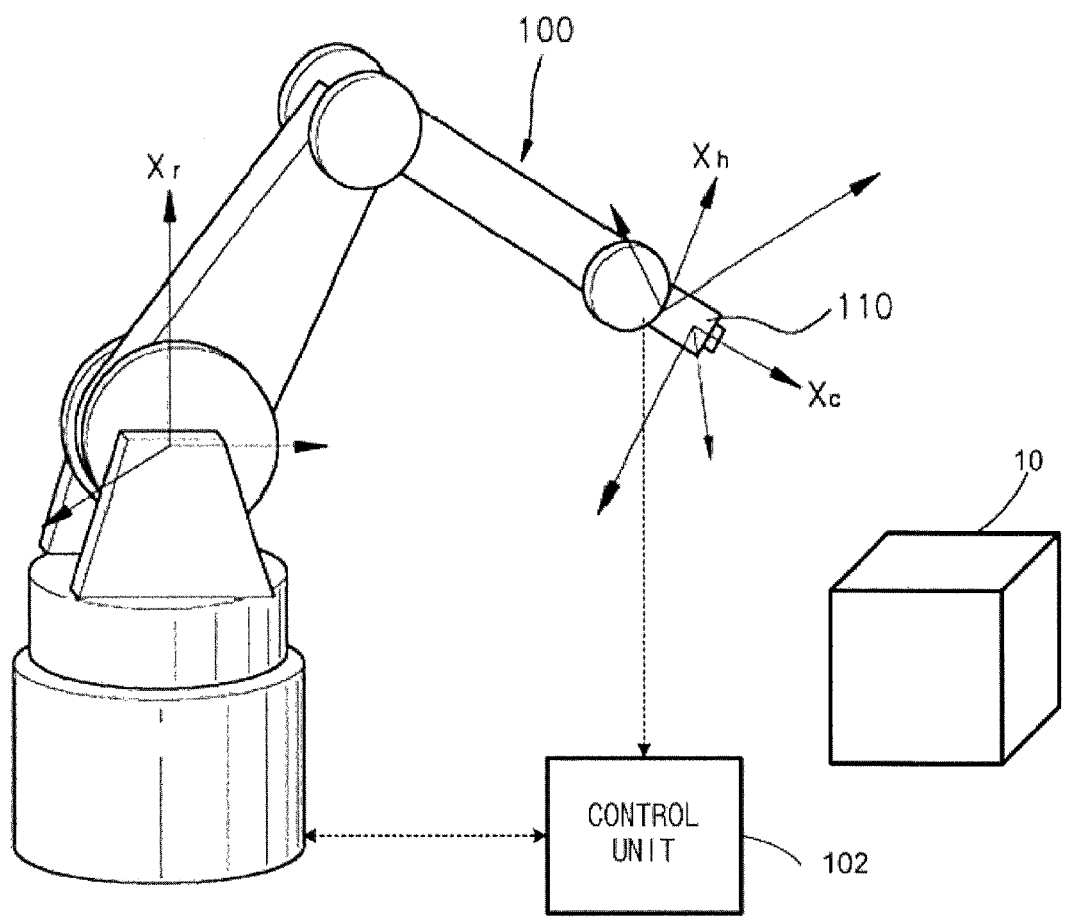
FIG. 1 is a view exemplarily illustrating an image-based robot operating system to utilize a visual servoing technique.

Reference will now be made in detail to embodiments, examples of which are illustrated in the accompanying drawings, wherein like reference numerals refer to like elements throughout.

FIG. 1 is a view exemplarily illustrating an image-based robot operating system to utilize a visual servoing technique. As shown in FIG. 1, at least one Charge-Coupled Device (CCD) camera 110 (i.e., an imaging device) is attached to the tip of an industrial robot hand 100, and thus recognizes and controls movement of the robot hand 100 according to a result of analysis of an image acquired based on the movement of the robot hand 100. Here, non-described reference numeral 10 represents an object to be handled by the robot hand 100.

A control unit 102 receives an image from the camera 110, tracks the object, and generates and provides a control command to control the movement of the robot hand 100 to the robot hand 100 based on a result of the tracking, thereby allowing the robot hand 100 to assume a desired precise motion in regard to the object 10. That is, the control unit 102 performs modeling of an object (a 3D model) to be tracked to generate a plurality of planes, such rectangular planes. Further, the control unit 102 selects points within the respective modeled planes, and calculates projective invariants at two positions by tracking these points. Through such a method, a model consisting of planes and points present on the planes is generated. When the modeling is completed, the control unit 102 performs tracking of the object 10. For this purpose, the control unit 102 tracks the plural planes of the generated model, respectively. While tracking the plural planes, the control unit 102 checks a geometric constraint between the respective planes. That is, the respective planes form a regular relation in a space according to the shape of the object, and, for example, in case of a rectangular parallelepiped, the geometric constraint may be a relation of an angle of 90 degrees between the respective planes. While tracking the object, when a tracking failure rate is more than a designated level, a tracking failure warning is generated and the tracking is stopped. On the other hand, when the tracking failure rate is below the designated level, it is judged that accuracy in tracking of the object is of a reliable level and virtual planes of planes, tracking of which has failed, are generated. Here, the virtual planes of the planes, tracking of which has failed, are generated with respect to a plane having the highest accuracy in tracking, i.e., having the minimum sum total of distance errors. In order to generate the virtual planes, the geometric constraint between the respective planes is used. Separately from tracking of the respective planes, the selected points are tracked. When the generation of the virtual planes of the planes, tracking of which has failed, is completed, positions of all the planes including the generated virtual planes are optimized. The optimization is achieved by calculating 3D rigid body transform matrices of all the planes and minimizing the sum total of distance errors using the Newton's method. When the optimization is completed, an optimized position of the overall object with respect to an estimated plane is calculated. Here, the position is calculated only using the planes having projective invariants more than a designated level, while the planes having projective invariants below the designated level are excluded. When the tracking is completed, the tracking is terminated.

According an embodiment, control unit 102 includes a computer to perform operations.

Figure 2:
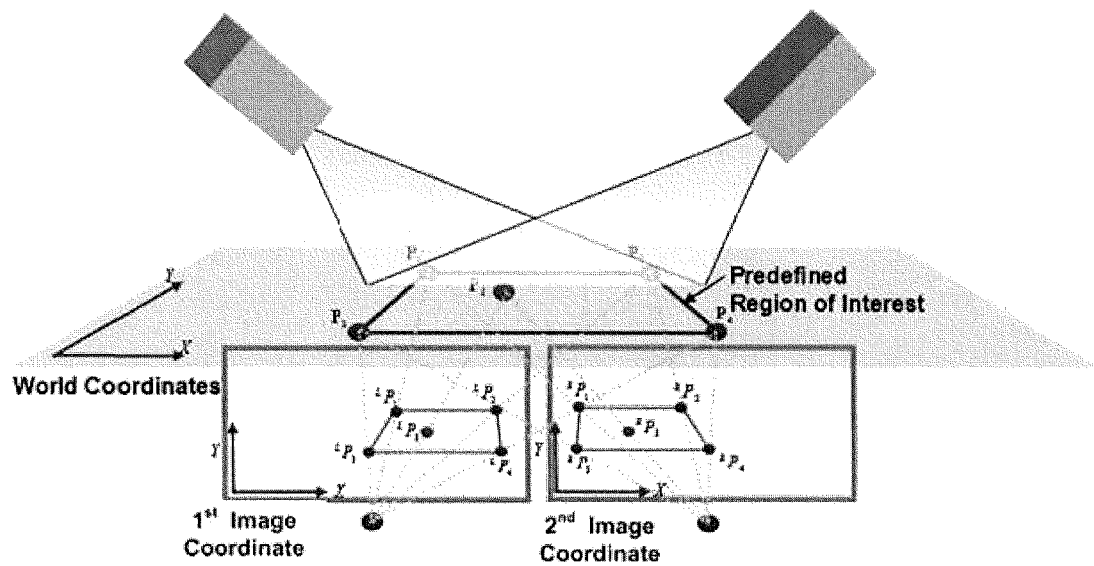
FIG. 2 is view illustrating projective invariants in an image-based robot operating system in accordance with an embodiment.

FIG. 2 is view illustrating projective invariants in an image-based robot operating system in accordance with an embodiment. As shown in FIG. 2, a method of calculating a projective invariant descriptor I from an arbitrary 2D shape is carried out by extracting a 2D outline from the image and calculating the projective invariant descriptor I from coordinates of points on the outline. Expressions below represent calculation of projective invariant descriptors from two 2D images, respectively.

$$I_1 = \frac{\det(P_5, P_2, P_3)\det(P_4, P_1, P_2)}{\det(P_4, P_2, P_3)\det(P_5, P_1, P_2)}$$

$$I_2 = \frac{\det(P_5, P_3, P_1)\det(P_4, P_1, P_2)}{\det(P_4, P_3, P_1)\det(P_5, P_1, P_2)}$$

Figure 3:
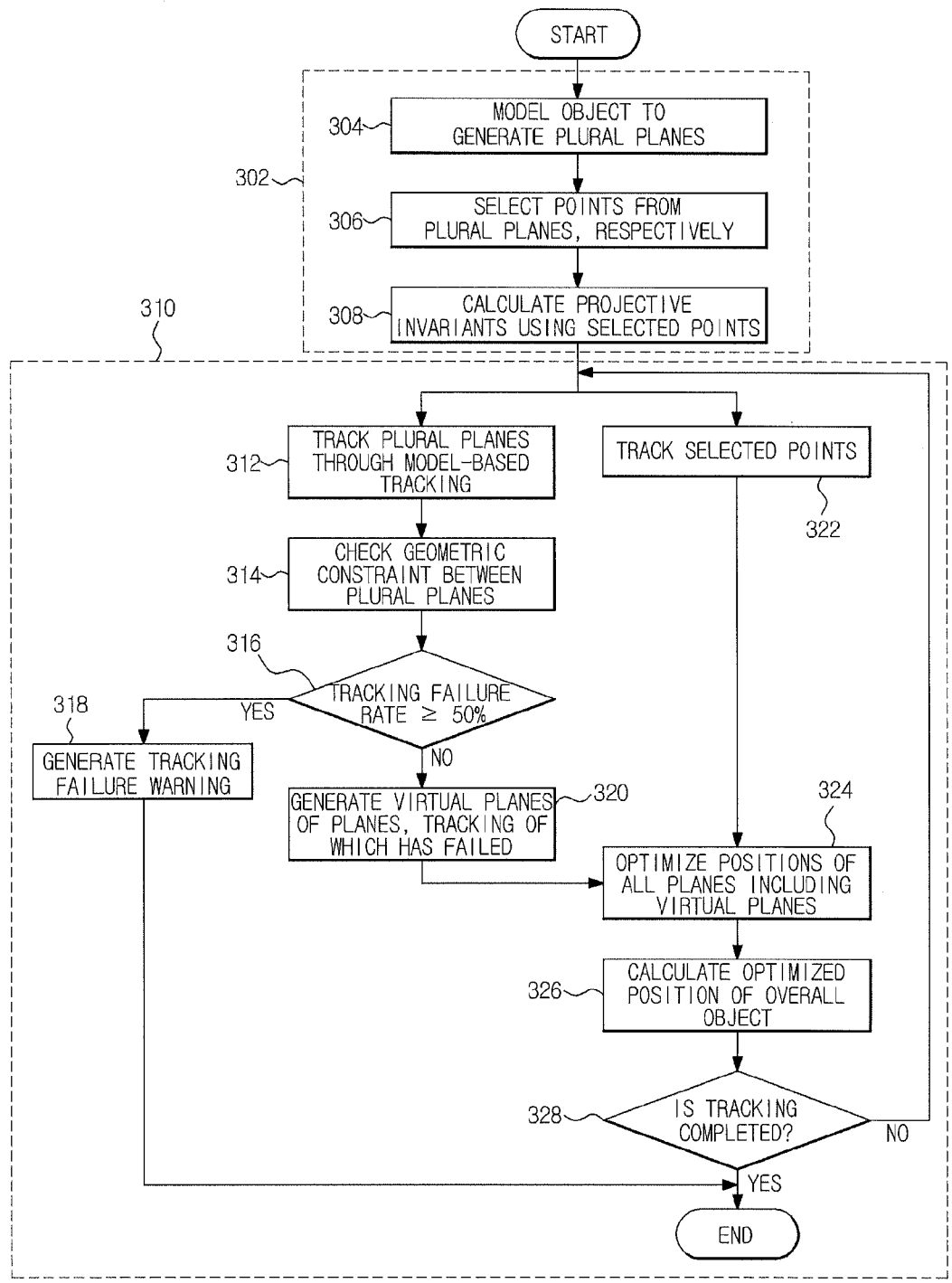
FIG. 3 is a flow chart illustrating a 3D object tracking method in accordance with an embodiment.

FIG. 3 is a flow chart illustrating a 3D object tracking method in accordance with an embodiment. In FIG. 3, 302 represents a modeling process of the object (the 3D model) to be tracked, and 310 represents a tracking process of the object.

First, modeling of the object (the 3D model) to be tracked to generate a plurality of planes, such as rectangular planes, is performed (operation 304). For this purpose, two or more images of the corresponding object at different positions where calibration is carried out are obtained. Further, points within the respective modeled planes are selected (operation 306), and projective invariants at two positions are calculated by tracking the points (operation 308). Through the above method, a model consisting of planes and points present on the planes is generated.

Reference numeral 310 represents the tracking process of the object. During the tracking process (operation 310), the respective planes of the model generated in operation 302 are tracked (operation 312).

While tracking the respective planes, a geometric constraint between the respective planes is checked (operation 314). The respective planes form a regular relation in a space according to the shape of the object, and, for example, in case of a rectangular parallelepiped, the geometric constraint may be a relation of an angle of 90 degrees between the respective planes.

While tracking the object, when a tracking failure rate is more than 50% (yes in operation 316), a tracking failure warning is generated (operation 318), and the tracking is stopped. That is, if the number of tracked planes is 2n and tracking of n or more planes fails, it is judged that the tracking failure rate is more than 50%. In this case, accuracy in tracking of the object is excessively low and the tracking of the object is deemed to have failed, and thus the tracking is stopped.

On the other hand, if the tracking failure rate is below 50% (no in operation 316), it is judged that accuracy in tracking of the object is of a reliable level and virtual planes of planes, tracking of which has failed, are generated (operation 320). The virtual planes of the planes, tracking of which has failed, are generated with respect to a plane having the highest accuracy in tracking, i.e., having the minimum sum total of distance errors. In order to generate the virtual planes, the geometric constraint between the respective planes is used.

Separately from the tracking of the respective planes in operation 312, the points selected in operation 306 are tracked (operation 322).

When the generation of the virtual planes of the planes, tracking of which has failed, is completed, positions of all the planes including the generated virtual planes are optimized (operation 324). The optimization is achieved by calculating 3D rigid body transform matrices of all the planes and minimizing the sum total of distance errors using Newton's method.

When the optimization is completed, an optimized position of the overall object with respect to an estimated plane is calculated (operation 326). Here, the position is calculated using only the planes having projective invariants more than a designated level, while the planes having projective invariants below the designated level are excluded.

When the tracking is completed, the tracking is terminated (yes in operation 328. If the tracking is not completed (no in operation 328), the tracking process from operation 312 to operation 326 is repeated.

Figure 4:
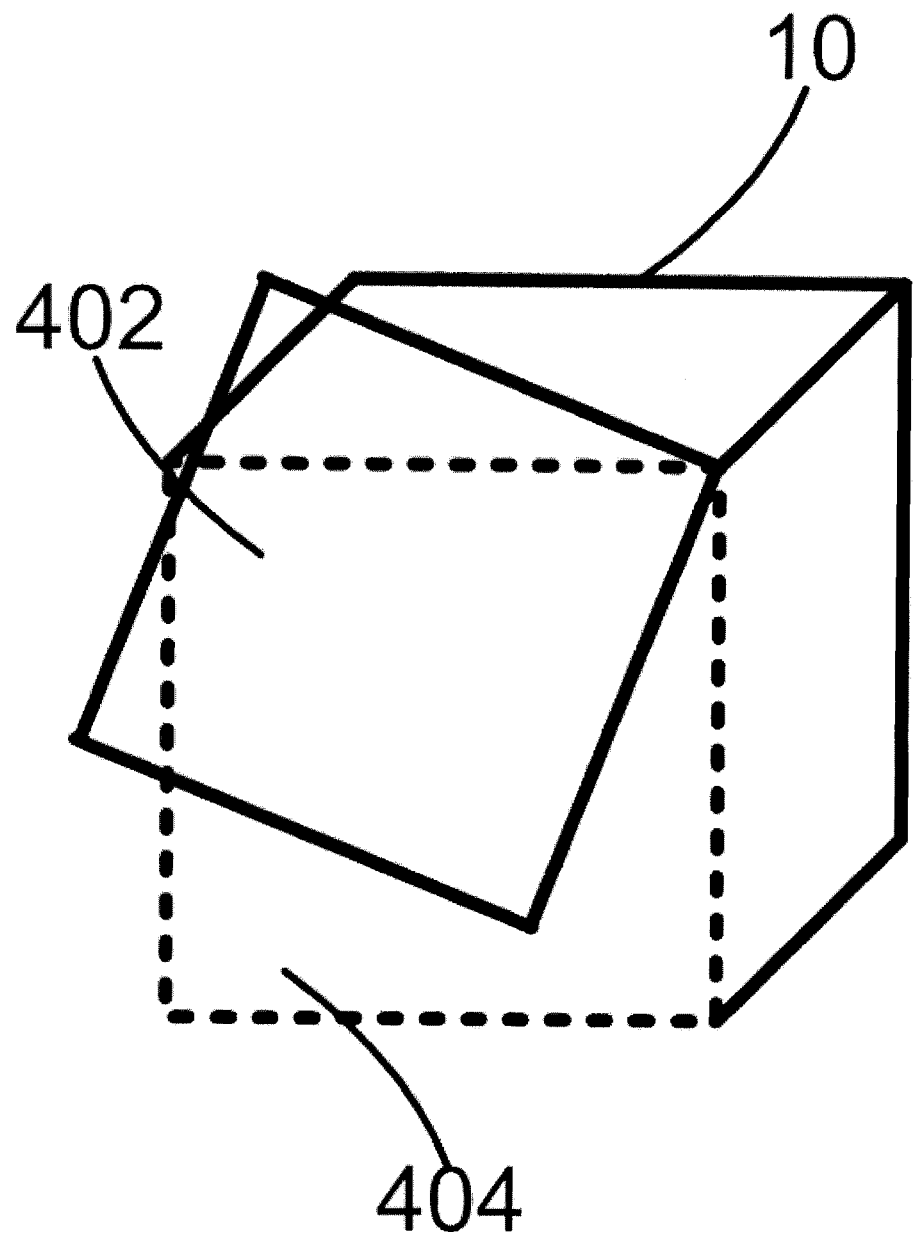
FIG. 4 is a view illustrating generation of a virtual plane of the object in accordance with an embodiment.

FIG. 4 is a view illustrating generation of a virtual plane of the object in accordance with an embodiment. As shown in FIG. 4, in order to generate a virtual plane 404 of a plane 402, tracking of which has failed, the virtual plane 404 of the plane 402, tracking of which has failed, is generated with respect to a plane having the highest accuracy in tracking, i.e., having the minimum sum total of distances of the edges. In order to generate the virtual planes, the geometric constraint between the respective planes is used.

As is apparent from the above description, in a 3D object tracking method and apparatus in accordance with an embodiment, a model of an object to be tracked is divided into a plurality of polygonal planes and the object is tracked using texture data of the respective planes and geometric data between the respective planes to enable more precise tracking.

Embodiments can be implemented using computing hardware (computing apparatus) and/or software, such as (in a non-limiting example) any computer that can store, retrieve, process and/or output data and/or communicate with other computers. The results produced may be displayable on a display device. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A 3D object tracking method comprising:
modeling, by a computer, an object by
generating, by a computer, a plurality of planes,
selecting, by a computer, points from among the plurality of planes, respectively, and
calculating, by a computer, projective invariants using the selected points; and
tracking, by a computer, the plurality of planes, respectively, and using the calculated projective invariants, to track the object.

2. The 3D object tracking method according to claim 1, wherein the tracking of the plurality of planes is achieved through model-based tacking.

3. The 3D object tracking method according to claim 2, wherein, in the tracking of the plurality of planes, when a tracking failure rate is below a designated level, virtual planes of planes, tracking of which has failed, are generated, and the object is tracked using the virtual planes.

4. The 3D object tracking method according to claim 3, wherein, in the tracking of the plurality of planes, when the tracking failure rate is more than the designated level, a tracking failure warning is generated and the tracking is stopped.

5. The 3D object tracking method according to claim 4, wherein the designated level is 50%.

6. The 3D object tracking method according to claim 1, further comprising:
controlling movement of a robot based on a result of said tracking.

7. A 3D object tracking apparatus comprising:
an imaging device to capture an image of an object to be tracked; and
a control unit to
perform modeling of the object to be tracked by generating a plurality of planes, selecting points from among the plurality of planes, respectively, and calculating projective invariants using the selected points, and
track the object by tracking the plurality of planes, respectively, and by using the calculated projective invariants.

8. The 3D object tracking apparatus according to claim 7, wherein the tracking of the plurality of planes is achieved through model-based tacking.

9. The 3D object tracking apparatus according to claim 8, wherein, in the tracking of the plurality of planes, when a tracking failure rate is below a designated level, the control unit generates virtual planes of planes, tracking of which has failed, and tracks the object using the virtual planes.

10. The 3D object tracking apparatus according to claim 9, wherein, in the tracking of the plurality of planes, when the tracking failure rate is more than the designated level, the control unit generates a tracking failure warning and stops the tracking.

11. The 3D object tracking apparatus according to claim 10, wherein the designated level is 50%.

12. A robot comprising:
a 3D object tracking apparatus according to claim 7; and
a computer controlling movement of the robot based on the tracking of the object by the control unit.

13. An apparatus comprising:
means for generating a plurality of planes corresponding to a 3D object, for selecting points from among the plurality of planes, respectively, and for calculating projective invariants using the selected points, to thereby model the object;
means for tracking the plurality of planes and for using the calculated projective invariants to thereby track the object; and
a robot which is controlled based on a result of the tracking.

14. A 3D object tracking method comprising:
modeling, by a computer, an object to generate a plurality of planes; and
tracking, by a computer, the plurality of planes, respectively, to track the object, wherein
the tracking of the plurality of planes is achieved through model-based tacking, and
in the tracking of the plurality of planes, when a tracking failure rate is below a designated level, virtual planes of planes, tracking of which has failed, are generated, and the object is tracked using the virtual planes.

15. The 3D object tracking method according to claim 14, wherein, in the tracking of the plurality of planes, when the tracking failure rate is more than the designated level, a tracking failure warning is generated and the tracking is stopped.

16. The 3D object tracking method according to claim 15, wherein the designated level is 50%.

17. A 3D object tracking apparatus comprising:
an imaging device to capture an image of an object to be tracked; and
a control unit to perform modeling of the object to be tracked to generate a plurality of planes, and to track the object by tracking the plurality of planes, respectively, wherein
the tracking of the plurality of planes is achieved through model-based tacking, and
in the tracking of the plurality of planes, when a tracking failure rate is below a designated level, the control unit generates virtual planes of planes, tracking of which has failed, and tracks the object using the virtual planes.

18. The 3D object tracking apparatus according to claim 17, wherein, in the tracking of the plurality of planes, when the tracking failure rate is more than the designated level, the control unit generates a tracking failure warning and stops the tracking.

19. The 3D object tracking apparatus according to claim 18, wherein the designated level is 50%.

\* \* \* \* \*

UNITED STATES PATENT AND TRADEMARK OFFICE
CERTIFICATE OF CORRECTION

PATENT NO. : 8,737,686 B2  
APPLICATION NO. : 13/204888  
DATED : May 27, 2014  
INVENTOR(S) : Yoon et al.

It is certified that error appears in the above-identified patent and that said Letters Patent is hereby corrected as shown below:

In the Claims

Column 5, Line 43, in Claim 2, delete "tacking." and insert -- tracking. --, therefor.
Column 6, Line 6, in Claim 8, delete "tacking." and insert -- tracking. --, therefor.
Column 6, Line 41, in Claim 14, delete "tacking," and insert -- tracking, --, therefor.
Column 6, Line 60, in Claim 17, delete "tacking," and insert -- tracking, --, therefor.

Signed and Sealed this
Twelfth Day of August, 2014

Michelle K. Lee
*Deputy Director of the United States Patent and Trademark Office*